(12) United States Patent
Akl-Chedid et al.

(10) Patent No.: US 11,585,993 B2
(45) Date of Patent: *Feb. 21, 2023

(54) INTEGRATED PASSIVE OPTICAL TAP AND OPTICAL SIGNAL TERMINATION

(71) Applicant: Accedian Networks Inc., St-Laurent (CA)

(72) Inventors: Ziad Akl-Chedid, Montreal (CA); Nicolas Côté, L'Ile Bizard (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,918

(22) Filed: Aug. 26, 2020

(65) Prior Publication Data

US 2020/0386960 A1    Dec. 10, 2020

Related U.S. Application Data

(63) Continuation of application No. 15/017,203, filed on Feb. 5, 2016, now Pat. No. 10,809,471.

(51) Int. Cl.
| | |
|---|---|
| *H04B 10/079* | (2013.01) |
| *G02B 6/42* | (2006.01) |
| *H04B 10/40* | (2013.01) |
| *H04B 10/25* | (2013.01) |
| *H04B 10/07* | (2013.01) |

(52) U.S. Cl.
CPC ......... *G02B 6/4286* (2013.01); *G02B 6/4292* (2013.01); *H04B 10/25891* (2020.05); *H04B 10/40* (2013.01); *H04B 10/07* (2013.01); *H04B 10/0795* (2013.01)

(58) Field of Classification Search
None
See application file for complete search history.

(56) References Cited

U.S. PATENT DOCUMENTS

| | | | | |
|---|---|---|---|---|
| 4,741,585 A | * | 5/1988 | Uken | G02B 6/4201 385/32 |
| 4,747,652 A | * | 5/1988 | Campbell | G01M 11/35 385/32 |
| 4,810,052 A | * | 3/1989 | Fling | G02B 6/2826 398/139 |
| 4,848,999 A | * | 7/1989 | Taylor | G02B 6/2817 385/48 |
| 6,445,856 B1 | * | 9/2002 | Yang | G01J 1/4257 356/213 |

(Continued)

OTHER PUBLICATIONS

Keiser, Gerd, FTTX Concepts and Applications, 2006, John Wiley & Sons, Inc., pp. 45-59 (Year: 2006).*

*Primary Examiner* — Jai M Lee
(74) *Attorney, Agent, or Firm* — Stratford Group Ltd.

(57) ABSTRACT

An integrated pluggable optical tap module configured to be coupled to a host interface of a network equipment for tapping a signal of an optical transport link comprises a first, a second optical interface, and an active optical receiver. The optical pluggable module also includes a passive optical tap for splitting a signal received from the first optical interface and transmitting the signal on the second optical interface and a copy of the signal to the active optical receiver. The active optical receiver converts said signal to an electrical signal for transmission to the host interface.

8 Claims, 7 Drawing Sheets

(56) References Cited

U.S. PATENT DOCUMENTS

| | | | | |
|---|---|---|---|---|
| 9,735,870 | B2* | 8/2017 | Fung | H04B 10/2589 |
| 10,809,471 | B2* | 10/2020 | Akl-Chedid | G02B 6/00 |
| 2003/0016692 | A1* | 1/2003 | Thomas | H04N 7/17309 |
| | | | | 370/468 |
| 2003/0202748 | A1* | 10/2003 | Gordon | G02B 6/2821 |
| | | | | 385/24 |
| 2004/0223769 | A1* | 11/2004 | Hoshida | H04B 10/07955 |
| | | | | 398/188 |
| 2005/0050205 | A1* | 3/2005 | Gordy | G06F 13/387 |
| | | | | 709/227 |
| 2006/0008210 | A1* | 1/2006 | Cornell | G02B 6/2804 |
| | | | | 385/48 |
| 2006/0083511 | A1* | 4/2006 | Edmunds | H04L 43/00 |
| | | | | 398/9 |
| 2007/0047875 | A1* | 3/2007 | Sezerman | H04B 10/0795 |
| | | | | 385/48 |
| 2007/0280591 | A1* | 12/2007 | Nelson | H04B 10/0795 |
| | | | | 385/24 |
| 2009/0154512 | A1* | 6/2009 | Simons | G02B 6/4206 |
| | | | | 372/108 |
| 2013/0279856 | A1* | 10/2013 | Boduch | G02B 6/4471 |
| | | | | 385/59 |
| 2015/0093073 | A1* | 4/2015 | Wright | H04B 10/27 |
| | | | | 385/24 |
| 2015/0288449 | A1* | 10/2015 | Coffey | G02B 6/3897 |
| | | | | 398/141 |
| 2017/0227725 | A1* | 8/2017 | Akl-Chedid | G02B 6/4286 |
| 2018/0062985 | A1* | 3/2018 | Iwasaki | H04L 49/355 |

* cited by examiner

INTEGRATED PASSIVE OPTICAL TAP AND OPTICAL SIGNAL TERMINATION

CROSS-REFERENCE TO RELATED APPLICATIONS

This application is a continuation of U.S. patent application Ser. No. 15/017,203, filed Feb. 5, 2016, now allowed, which is hereby incorporated by reference in its entirety.

FIELD OF THE INVENTION

The present disclosure relates to optical signal transport.

BRIEF SUMMARY

An integrated pluggable optical tap module configured to be coupled to a host interface of a network equipment for tapping a signal of an optical transport link comprises a first, a second optical interface, and an active optical receiver. The optical pluggable module also includes a passive optical tap for splitting a signal received from the first optical interface and transmitting the signal on the second optical interface and a copy of the signal to the active optical receiver. The active optical receiver converts said signal to an electrical signal for transmission to the host interface.

An integrated pluggable optical tap module configured to be coupled to a host interface of a network equipment for tapping a signal of an optical transport link comprises a first optical interface coupled to an optical to electrical converter and a second optical interface coupled to an electrical to optical converter. An electrical tap is included for splitting a signal received from the optical to electrical converter and for transmitting the signal on the electrical to optical converter for transmission on the second optical interface and for transmitting a copy of the signal to the host interface.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Because of certain regulatory arrangements or security concerns or for out-of service monetized functions, optical physical transport may be tapped in order to have access to an exact copy of transmitted information.

The act of tapping must be transparent to the underlying network functionality and thus have almost no impact on the transported signal and must not affect connectivity.

For scalability reasons, the equipment used for tapping should be cost-effective, have a small foot-print and be easy to maintain while being robust and reliable.

Figure 1:
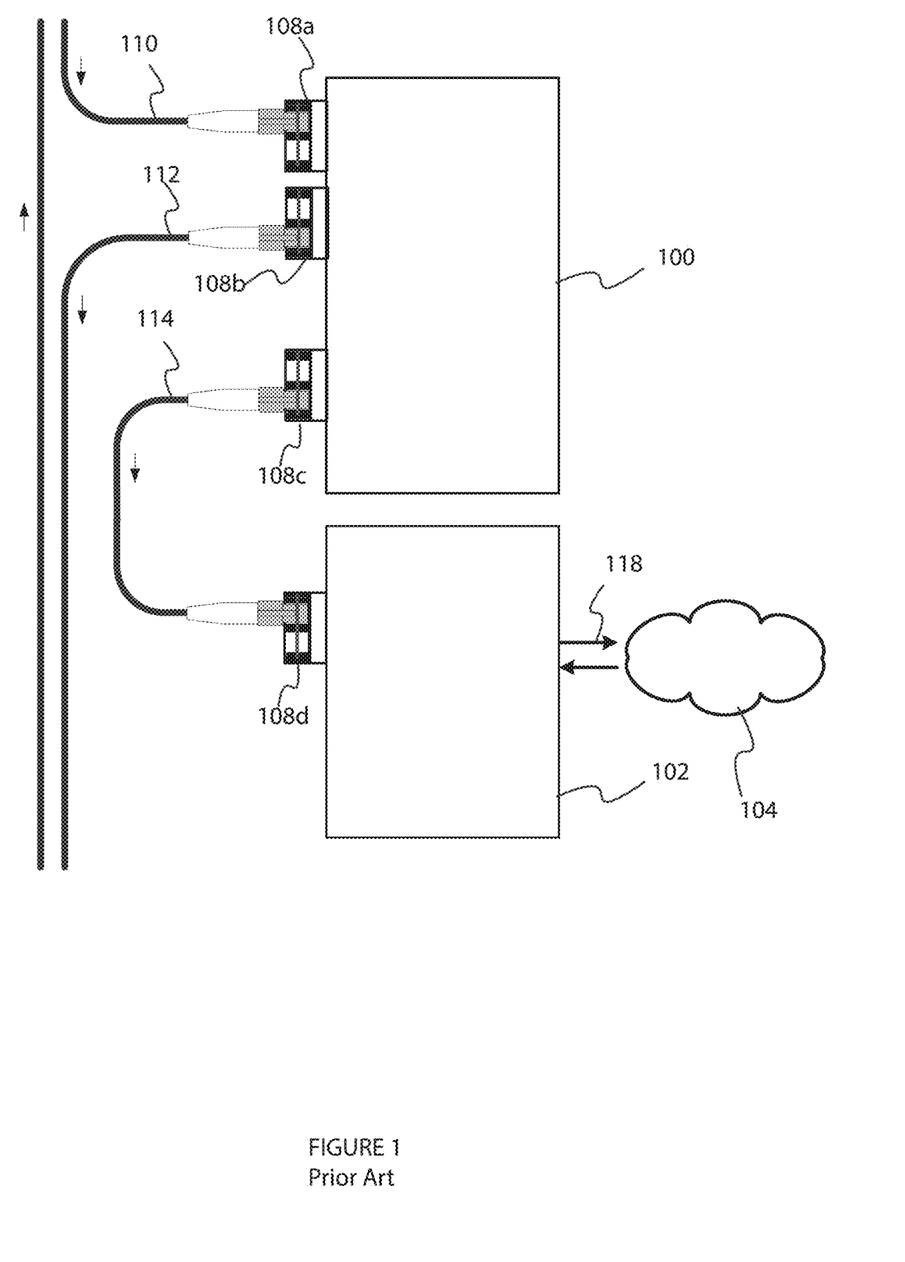
FIG. 1 is an example of an active optical tap device.

One existing solution for optical tapping is shown in FIG. I and known generically as active optical tap device.

The active optical tap device 100 terminates the optical physical transport link 110 using optical transceiver 108a. The device splits the signal and transmits one copy of the signal on the tapping link 112 via an optical transceiver 108b and the other copy on an intermediary link 114 via a third optical transceiver 108c. The intermediary link 114 terminates into the network equipment 102 using another optical transceiver 108d. Note that the four optical transceivers 108a . . . 108d only use one direction (receiving or transmitting) thus half of the component is unused. The signal is processed by the network equipment 102 and sent to a network 104 via another link 118. The active optical tap device 100 requires a power input.

The issues with using active optical tap systems are that they require power and they may become a single point of failure affecting the main path. A high density tap system may become a single point of failure for many network paths at once. Device failure, manipulation and servicing impact the tapped transported signal. The devices require additional space (usually rack mounted) and lead to more inventory to manage. Extra optical transceivers 108a and 108c are required to terminate the original signal at the active optical tap system. An extra optical module 108b is required to terminate the tapped signal, when only the receive path is used.

Figure 2:
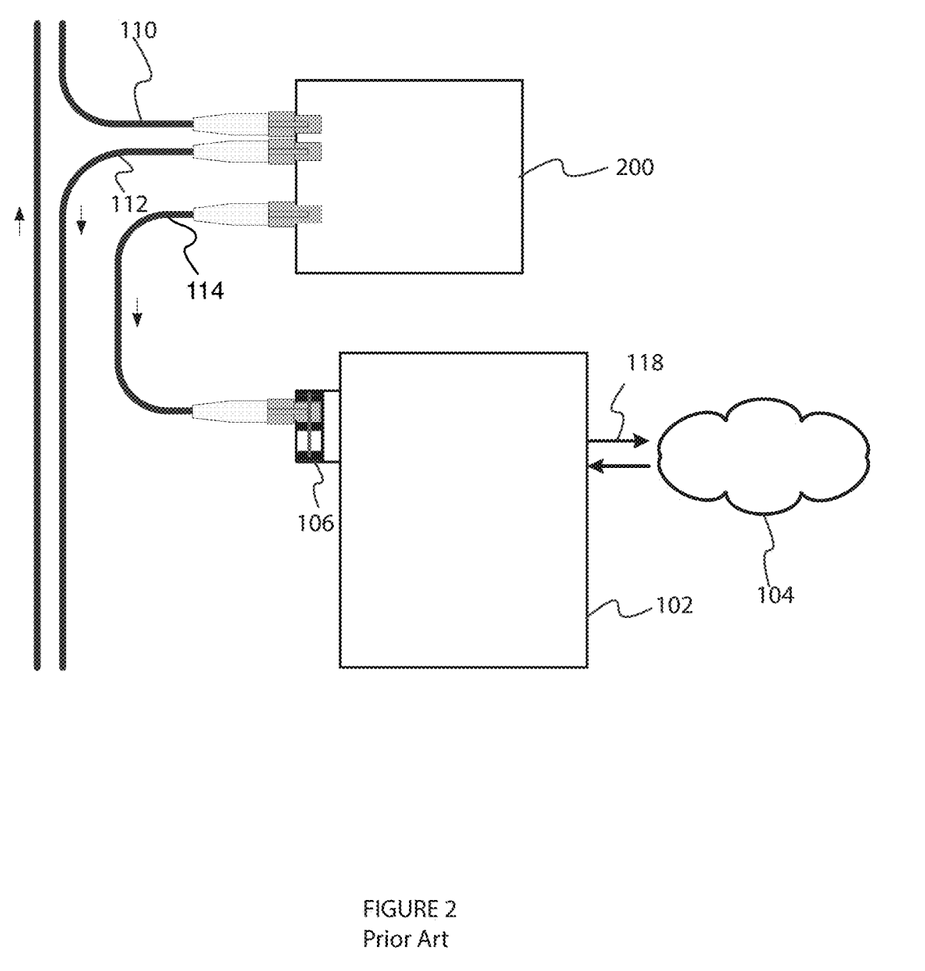
FIG. 2 is an example of a passive optical tap device.

Another existing solution is the passive optical tap device as shown in FIG. 2.

The passive optical tap device 200 terminates the optical physical transport link 110. The passive device splits the signal and transmits one copy of the signal on the tapping link 112 and the other copy on intermediary link 114 which terminates into the network equipment 102 using another optical transceiver 106. The signal is processed by the network equipment 102 and sent to a network 104 via another link 118. The passive optical tap device 200 does not require a power input.

The issues with the passive optical tap devices include the need for a separate device which requires additional space (usually rack mounted) and inventory management. An extra optical module is required to terminate tap signal (where only the receive path is needed). Manipulation of the device may affect entire tapped links.

Figure 3:
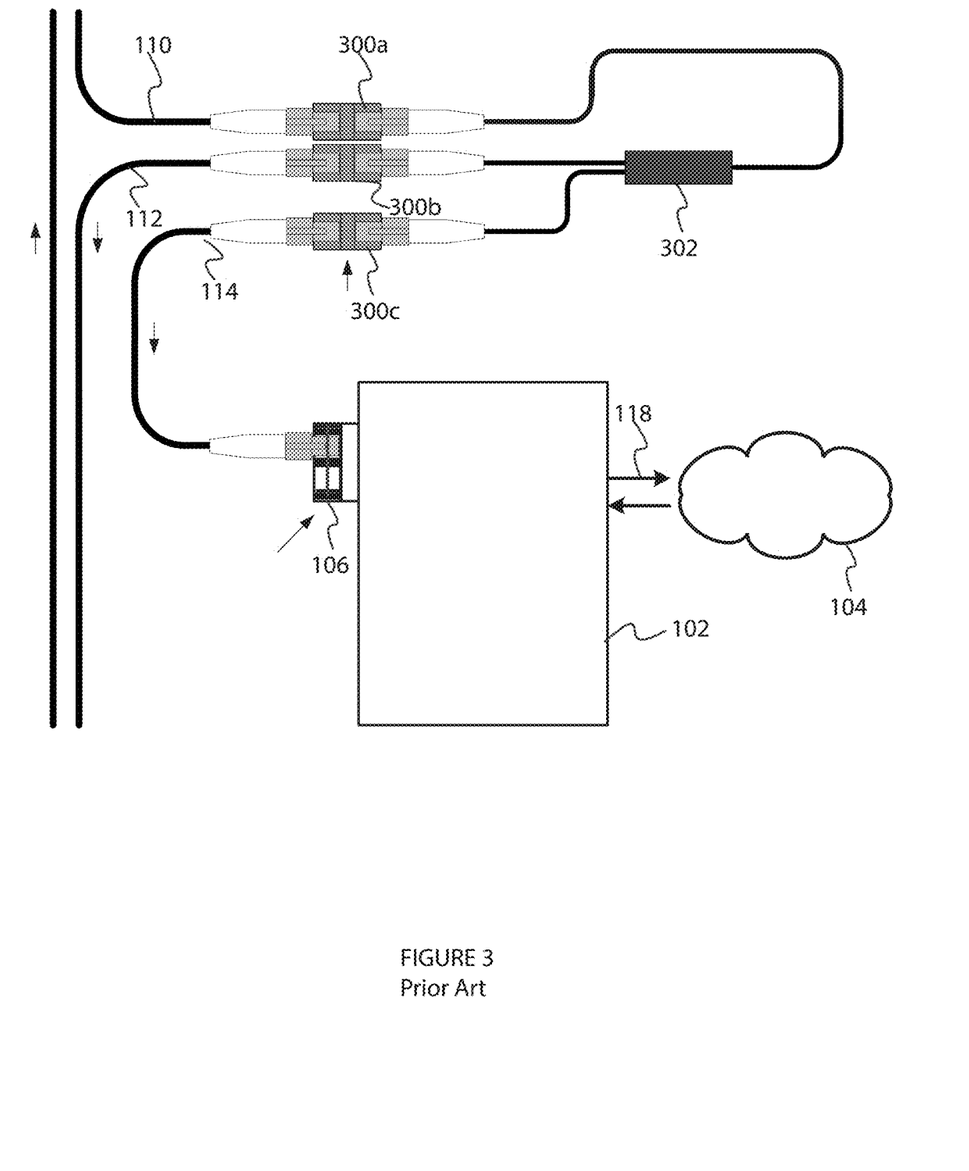
FIG. 3 is an example of an optical fiber splitter.

Another existing solution is the optical fiber splitter as shown in FIG. 3. In this solution, the optical physical transport link 110 terminates on an optical connector 300a which connects to the input of the optical fiber splitter 302. The optical fiber splitter 302 splits the optical signal received and transmits one copy to the tapping link 112 via another optical connector 300b. The other copy of the signal is sent to the intermediary link 114 which terminates into the network equipment 102 using another optical transceiver 106. The signal is processed by the network equipment 102 and sent to a network 104 via another link 118.

The issues with the optical fiber splitter device include fiber cable management which becomes increasingly complex, especially for scaled deployment, inventory management, and an extra optical module is required to terminate tap signal, when only the receive path is used. Manipulation of the device may affect the entire tapped links.

Figure 4:
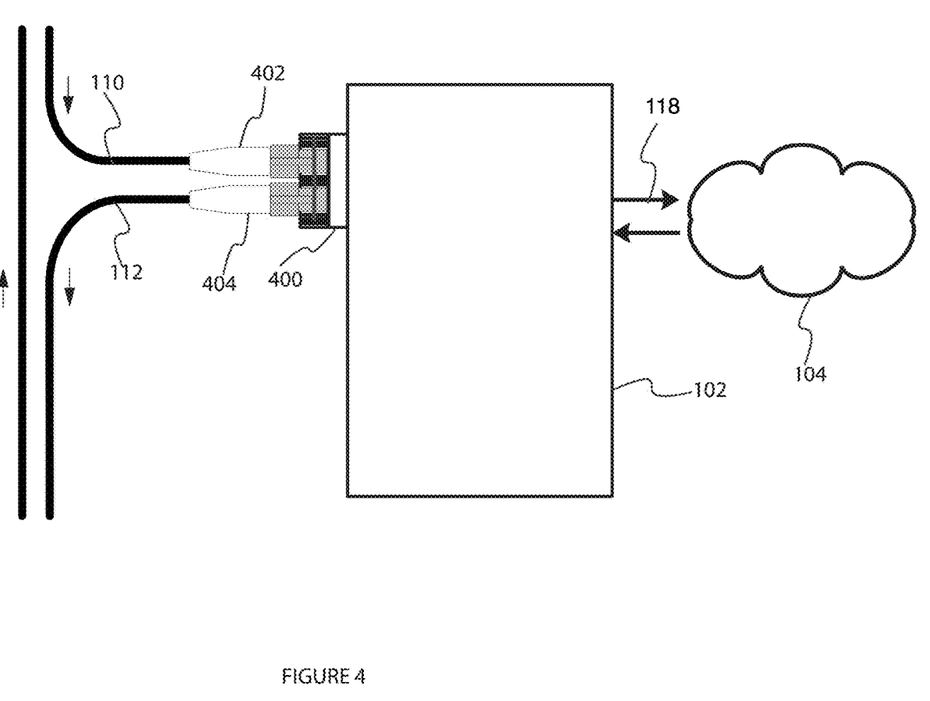
FIG. 4 is an example of a first embodiment of an Integrated Pluggable Optical Tap.

An Integrated Pluggable Optical Tap (IPOT) module is exemplified in FIG. 4 as a first embodiment. The module 400 is integrated into an optical pluggable module, such as but not limited to, Small Form-factor Pluggable (SFP), C form-factor pluggable (CFP), Quad Small Form-factor Pluggable (QSFP), 10 Gigabit Small Factor Pluggable (XFP), Enhanced small form-factor pluggable transceivers (SFP+) or optical pluggable modules conforming to the XENPAK standard known in the art. The length of the module can adapt to the desired design requirements.

In the first embodiment, the IPOT 400 is plugged directly into the network equipment 102. The optical physical transport link 110 terminates a first interface 402 of the IPOT 400. The IPOT 400 splits the signal and transmits a copy directly to the tapping link 112, via a second interface 404 while the other copy of the signal is processed by the network equipment 102 and sent to a network 104 via another link 118.

Figure 5:
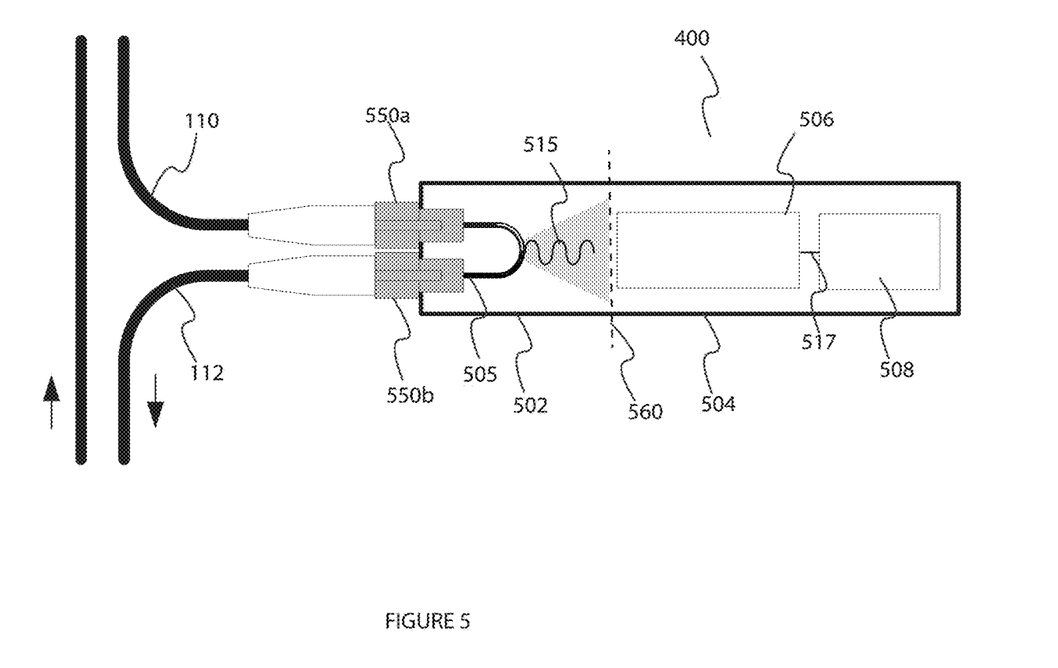
FIG. 5 depicts a detailed embodiment of the Integrated Pluggable Optical Tap.

Referring to FIG. 5, the IPOT module 400 comprises two stages; a passive optical tap stage 502 and an active optical receiver stage 504.

The passive optical tap stage 502 has no active component. It provides a connection point 550a and 550b for the link 110 requiring a tap and for the tapping link 112 and houses the signal splitter 510 which creates a copy of the incoming optical signal 505 and transmits the original signal to the connector 550b and the tapping link 112.

The active optical receiver stage 504 is an active component 506 that receives an optical signal 515 and converts it to an electrical signal 517. Only the required receiving function is implemented unlike prior art solutions, therefore there are no wasted functionality in the component, leading to lower consumption is minimized since only the receiver path is required. The electrical signal is then passed to the host interface 508 for transmission to the network equipment and processing by the network equipment.

The IPOT module can optionally be designed such that the passive optical tap stage can be disconnected at 560 from the package for maintainability, with no interruption to tapped link communication.

The signal splitter technologies are known in the art and may comprise but are not limited to one of dielectric mirrors, beam splitter cubes (prisms), fuse biconical taper (fiber couplers), planar lightwave circuit. The choice of the technology depends on cost, size, power and how much degradation can be accounted for by the optical to electrical converter.

The IPOT can be designed to support any optical slip ratios, any types of wavelengths, any types of connectors, any types of fiber (e.g. single-mode and multi-mode fiber, etc . . . ) and any link speeds.

This embodiment provides several advantages over existing solutions, comprising: savings in component cost since there is no need for an extra SFP to terminate tap signal and no need of a patch fiber. Reduced inventory management and no wasted transmitter which optimizes power usage. The solution is very scalable as the cost of the tapping solution is proportional to links requiring a tap. The usefulness of the passively tapped signal is maximized since the receiver electronics feeds directly off the tapped signal. The electronic receiver stage is decoupled from the passive optical stage allowing for maintenance of the receiver without interruption to tapped link. There is no laser safety hazard certification required since the package only acts as a receive path, thus no laser generation, making the design process less demanding, making it safer for the craft-person to plugging in the module in a host device.

Figure 6:
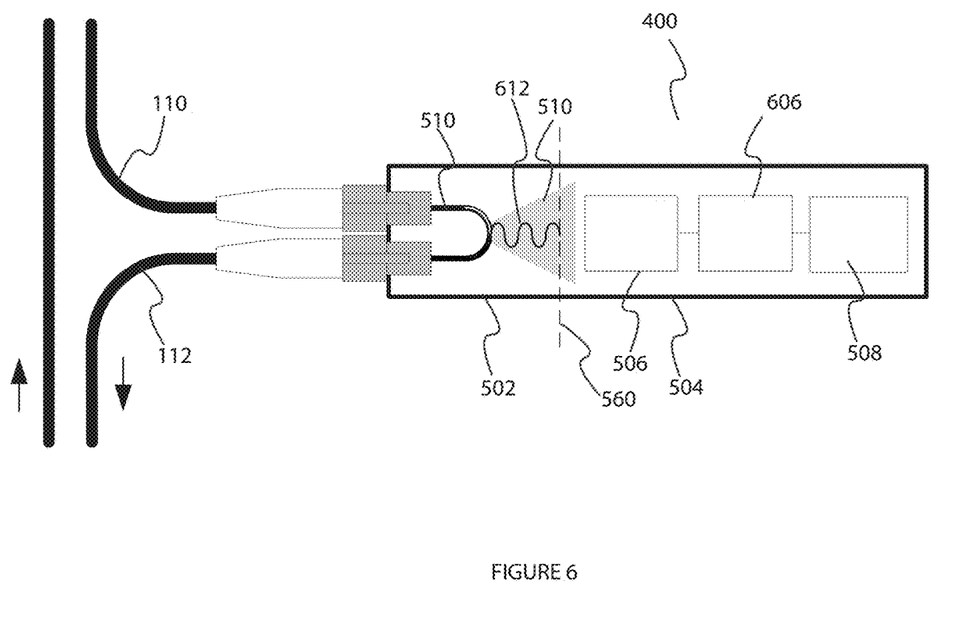
FIG. 6 depicts a second detailed embodiment of the Integrated Pluggable Optical Tap.

Referring to FIG. 6, the active optical receiver stage 504 may optionally include a smart function component 606. Programmable logic can be embedded in the component 606 of the device in order to provide value added, on demand, customized and dynamic functionality to evaluate, monitor and/or modify the signal. Example of value add functionality include any combination, but not limited to, one or more of the following: Rate conversion from 10 Gbps (Tap side) to 1 Gbps (Host side), rate conversion from 1 Gbps (Tap side) to 100 Mbps (Host side), packet filtering, traffic policing and traffic shaping, performance monitoring, statistics gathering and network synchronized time-stamping of captured frame. In this embodiment, the IPOT module can also optionally be designed such that the passive optical tap stage can be disconnected at 560 from the package for maintainability, with no interruption to tapped link communication.

Figure 7:
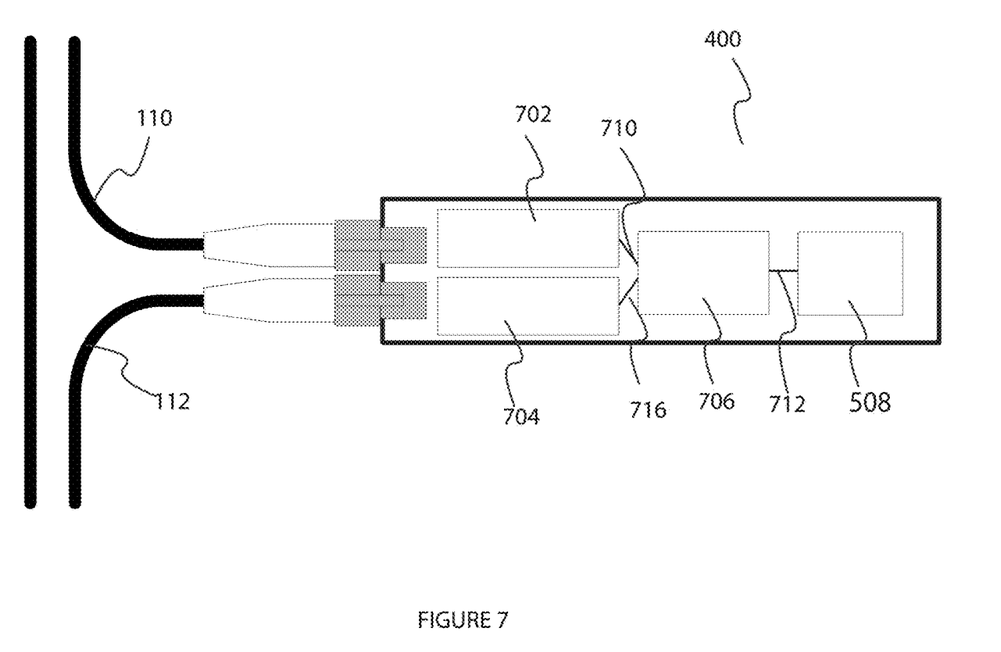
FIG. 7 depicts a second detailed embodiment of the Integrated Pluggable Optical Tap.

Now referring to FIG. 7, if the passive aspect of the tapping is not important to ensure reliability of the part, an embodiment of the IPOT 400 can combine an active tap and termination, where the tap action is done on the electrical side of the signal temlination. In this case the incoming optical signal 110 is sent to an optical to electrical converter 702, the resulting electrical signal 710 is processed by the smart function component 706 which may evaluate, monitor and/or modify the signal before sending the signal 712 to the host interface 508. The smart function 706 also performs the splitting of the signal and transmits a copy 716 of the electrical signal to the tapping link 112 via an electrical to optical converter 704.

This embodiment maintains all the unique aspects of the invention (except for the advantage of maintainability and resiliency of the passive stage) and also supports all the enumerated variations mentioned above.

One of the many benefits of integrating the value add functionalities listed above is to have a significant resource saving impact (capital and operating expenses) on the system deployment requirements by reducing the demand on the network equipment and infrastructure needed to interface with the network.

Although the algorithms described above including those with reference to the foregoing flow chaffs have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A pluggable optical module for tapping an optical signal of an optical transport link comprising:
 a passive optical tap creating a copy of an optical signal received from a first optical interface and transmitting the optical signal on a second optical interface, the passive optical tap transmitting the copy of the optical signal to an optical receiver via a free space transmission path, the optical receiver converting the copy of the optical signal into an electrical signal for transmission to a host interface; and
 wherein the passive optical tap can be disconnected from the pluggable optical module with no interruption to the signal.

2. The pluggable optical module of claim 1, wherein the pluggable optical module is selected from the group consisting of SFP, SFP+, CFP, QSFP, XFP, XENPAK.

3. The pluggable optical module of claim 1, wherein the optical receiver is an active optical comprising a smart function component to modify the electrical signal before sending to the host interface.

4. The pluggable optical module of claim 3, wherein the smart function component modifies the electrical signal by applying one or more of rate conversion, packet filtering, traffic policing, traffic shaping, performance monitoring, performance statistics gathering, network synchronized time-stamping of captured frame.

5. A method for tapping an optical signal of an optical transport link coupled to a pluggable optical module, the method comprising:
 creating a copy, by a passive optical tap of the pluggable optical module, of an optical signal received from a first optical interface and transmitting the optical signal on a second optical interface;
 transmitting the copy of the optical signal to an optical receiver via a free space transmission path;
 converting, by the optical receiver, the copy of the optical signal into an electrical signal for transmission to a host interface; and
 wherein the passive optical tap can be disconnected from the pluggable optical module with no interruption to the optical signal.

6. The method of claim 5, wherein the pluggable module is selected from the group consisting of SFP, SFP+, CFP, QSFP, XFP, XENPAK.

7. The method of claim 6, wherein the optical receiver is an active optical receiver comprising a smart function component, and further comprising the step of:
 modifying, by the smart function component, the electrical signal before sending to the host interface.

8. The method of claim 7, wherein said modifying the electrical signal is done by applying one or more of rate conversion, packet filtering, traffic policing, traffic shaping, performance monitoring, performance statistics gathering, network synchronized time-stamping of captured frame.

* * * * *